Aug. 25, 1959  D. D. R. MACKINTOSH  2,900,839
VARIABLE THROW RADIAL PUMP
Filed Jan. 26, 1954
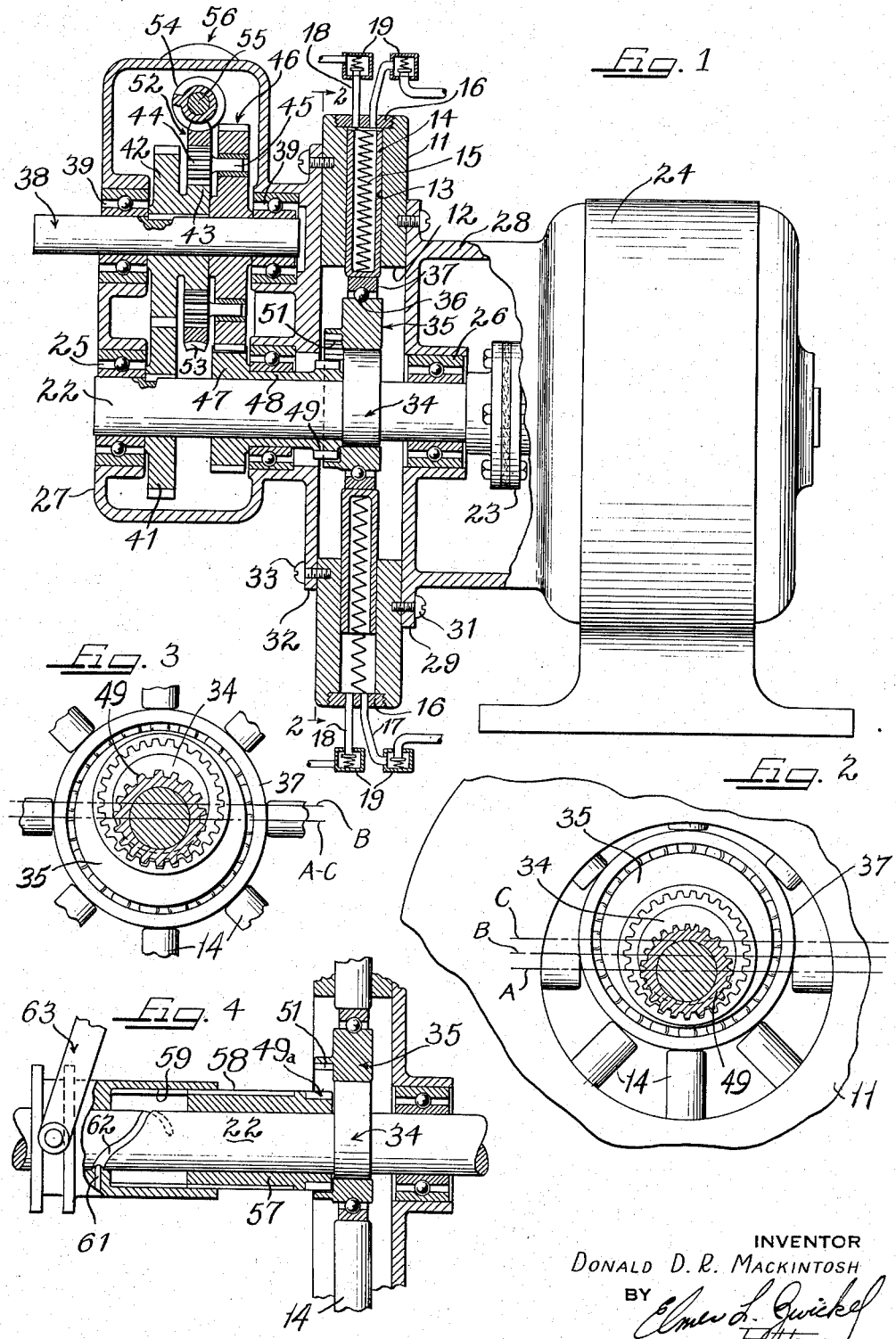
INVENTOR
DONALD D. R. MACKINTOSH
BY

United States Patent Office 2,900,839
Patented Aug. 25, 1959

2,900,839

VARIABLE THROW RADIAL PUMP

Donald D. R. Mackintosh, Chicago, Ill.

Application January 26, 1954, Serial No. 406,112

2 Claims. (Cl. 74—571)

The invention relates to improvements in readily controlled drive mechanism and is more particularly concerned with a planetary transmission drive means useful in a radial type pump having reciprocating pistons and with novel means for infinitely varying the throw of the pistons during operation of the pump.

Heretofore, radial pumps of the general type disclosed herein for purposes of illustration have embodied various means to adjust the eccentricity of an eccentric pin on a driven shaft in order to vary the throw of the pistons, but such means has proved to be lacking in exactness because of the fact that the adjustment does not give the very fine control required of a speed changer, particularly when applied to pumps used for maintaining critical volume.

The controlled drive mechanism embodying the present invention includes a main driving shaft having an eccentric fixed thereon about which is arranged, for co-action therewith, a floating eccentric ring connected with the driven shaft through a planetary gear assembly. The plantary gear assembly includes means for varying the relationship of the two eccentrics so as to increase or decrease the effect of said eccentrics upon means operated upon operation thereof. In the present disclosure, the eccentrics are employed to operate reciprocal pistons in a piston type radial pump and their relative positions determines the length of the stroke of each of said pistons to thereby control the flow of fluid being pumped. Adjustment of the relative positions of the eccentrics is obtained in one instance by adjusting the differential operating ring gear of the planetary gear assembly; a manually operated worm gear being provided for this purpose. In another instance, by means shiftable on the driven shaft.

It is therefore an object of the invention to provide novelly constructed variable control mechanism of the character described.

Another object of the invention is to provide a variable throw mechanism for a radial pump, or like apparatus, with novel drive means and novel means to adjust the operating relationship between co-acting eccentrics.

Another object is to provide eccentric drive means, including a pair of co-acting eccentrics, one adjustable during operation of the drive means to vary the effect of said eccentrics.

Another object is to provide a novel controllable drive mechanism which is not expensive to manufacture, is easy to adjust, can be adjusted with extreme accuracy during operation of the mechanism and maintained in such adjusted position, is very durable and efficient and will require but minimum servicing.

With the foregoing and other objects in view which will appear as the description proceeds, the invention consists of certain novel features of construction, arrangement and combination of parts hereinafter fully described, illustrated in the accompanying drawings, and particularly pointed out in the appended claims, it being understood that various changes in the form, proportion, size and minor details of the structure may be made without departing from the spirit or sacrificing any of the advantages of the invention.

For the purpose of facilitating an understanding of my invention, I have illustrated in the accompanying drawings a preferred embodiment thereof, from an inspection of which, when considered in connection with the following description, my invention, its mode of construction, assembly and operation, and many of its advantages should be readily understood and appreciated.

Referring to the drawings in which the same characters of reference are employed to indicate corresponding or similar parts throughout the several figures of the drawings:

Fig. 1 is a longitudinal central sectional view of a radial pump embodying the features of the present invention, showing selected parts in elevation.

Fig. 2 is a fragmentary section taken substantially on line 2—2 of Fig. 1.

Fig. 3 is a fragmentary sectional view similar to Fig. 2, but illustrating the eccentrics adjusted to a neutral or "no-throw" position.

Fig. 4 is a fragmentary sectional detail view showing a modified form of the invention.

Referring to the accompanying drawings, the embodiment of the invention disclosed in Figs. 1 to 3 inclusive is concerned with the installation of the novel controlled drive mechanism in a radial type pump. As illustrated, the radial type pump includes a circular body 11 having a central concentric opening 12 therein and a plurality of circumferentially spaced radial cylinders 13 extending therethrough from said central opening. Each of the cylinders 13 contains a reciprocal piston 14 closed at its inner end and normally held retracted inwardly radially by a spring 15 arranged within the piston and having one end bear against the inner closed piston end and its other end bear against a cap or other closure 16. Each closure 16 has a fluid inlet pipe 17 and fluid outlet pipe 18 extending therethrough in communication with the interior of the cylinder. Each of the pipes 17 and 18 is provided with a check valve 19 disposed to permit fluid to flow to and from the related cylinder 16 during reciprocal operation of the piston 14 therein. It is preferred, but not essential, that all of the inlet lines 17 to the cylinders 13 be connected to a common fluid source (not shown) and that all of the outlet fluid lines 18 from the cylinders 13 be connected to a common head or storage tank.

The pistons are adapted to be reciprocated within their respective cylinders 13 so as to maintain uniform volume in the outlet lines 18. In many instances of use of radial pumps of this character, it is exceedingly important to be able to increase or decrease the volume delivered by the pump so as to meet specific requirements. Suitable pressure control means not constituting a part of the present invention may be placed in the fluid lines. Accordingly, the present invention concerns itself with novel means to vary the throw of the pistons during pump operation, or while the pump is idle, and to maintain a critical volume at all times.

Adjustment and maintenance of the throw of the pistons so as to deliver and maintain pre-determined critical volumes may best be effected by incorporating, in the control mechanism, a planetary gear assembly such as is best illustrated in Fig. 1. As there shown, the planetary gear assembly and drive mechanism includes a shaft 22 disposed axially through the axial housing opening 12. Either end of the shaft 22 may be connected, as by means of a flexible coupling 23, to an electric motor 24, or other power source to insure uniform rotation of the shaft 22 during pump operation. The shaft 22 may be journalled in suitable bearings 25 and 26 provided for that purpose; the bearing 25 being included in a planetary gear casing 27 while the bearing 26 preferably is provided in a bell-housing 28 attached to or formed integral with the motor 24. As illustrated, the bell-housing 28 has an external flange 29 in face to face abutment with one face of the cylinder housing 11 and is secured thereto firmly as by lag screws 31. The planetary gear casing 27 similarly is provided with an external flange 32 at one end, which flange lies tightly against the opposite side of the cylinder housing 11 and is secured thereto firmly by lag screws 33.

The shaft 22 has firmly mounted or formed thereon an eccentric 34. Mounted snugly on the eccentric 34 is an eccentric ring 35 suitably provided on its peripheral face with anti-friction means 36 supporting an anti-friction ring 37 which affords a contact surface for the inner ends of the pistons 14. It should be quite apparent insofar as the description has proceeded that rotation of the shaft 22 will impart rotation to the fixed eccentric 34. Means, to be described presently, is provided to rotate the eccentric ring 35 at the same rate of speed as the fixed eccentric 34 so as to thereby cause the pistons to reciprocate within their respective cylinders 13 distances determined by the relative positions of the eccentric ring 35 and the fixed eccentric 34.

The specific means employed for imparting rotation to the eccentric ring 35 in unison with the fixed eccentric 34 will be described presently. It should be observed, however, upon referring to Figs. 2 and 3 that the eccentric opening in the eccentric ring 35 is offset from the axis of the ring a distance sufficient to permit said ring to be positioned, as illustrated in Fig. 2, so as to effect a maximum throw of the pistons 14 or, as illustrated in Fig. 3, so that its effective surface is concentric with the driven shaft 22 so as to impart no throw to the pistons 14. The means for adjusting the eccentric ring 35 relative to the fixed ring 34 is embodied in the planetary transmission assembly and its structure and operation will become apparent as the description proceeds.

Referring again to the Fig. 1 disclosure, the planetary transmission structure includes the driven shaft 22 and an idler shaft 38, the later being journalled in the planetary transmission casing 27 in bearings 39. A gear 41 is keyed or otherwise secured to the shaft 22, which gear is constantly in mesh with a gear 42 keyed or otherwise secured to the shaft 38. The gear 42 has an auxiliary gear 43 formed integral with one face thereof, which gear has a plurality of star wheels 44 meshed therewith. Each star wheel is carried on a stud 45 journalled in and projecting from one face of an idler gear 46 freely mounted on the shaft 38. The idler gear 46 meshes at all times with a gear 47 formed on one end of a sleeve 48 freely mounted on shaft 22. The other end of the sleeve 48 has an external lock gear 49 disposed in substantial abutment with the fixed eccentric 34. The gear 49 meshes at all times with an integral gear 51 formed on and projecting from one face of the eccentric ring 35. As in all planetary transmissions, the star wheels 44 mesh with an internal ring gear 52. In the present disclosure, the outside diameter of the ring gear 52 is provided with teeth 53 to receive meshed therewith a worm 54 carried on a shaft 55 disposed perpendicular to the shaft 38. The shaft 55 is suitably journalled in any conventional manner in the casing 27 and it has at least one of its ends extending to the outside of the casing to receive a manually operable handwheel 56.

During operation of the pump and its associated planetary gear mechanism, the eccentric ring 35 is rotated at the same rate of speed as the fixed eccentric 34. This occurs because the gears 42—43 have a predetermined step-up ratio and the gears 46 and 47 have a corresponding step-down ratio. As a consequence of this arrangement, the relative positions of the two eccentrics remains constant during operation, thus insuring maintenance of any required operating volume in the fluid lines 18 through reciprocation of the pistons associated therewith.

In order to vary the volume in the lines 18, it is only necessary to adjust the relative positions of the two eccentrics. This is accomplished through the planetary gear transmission by manipulation of the hand-wheel 56 to rotate the shaft 55 and worm 54 thereon in either direction. Such rotation of the worm 54 will impart comparable rotation to the normally stationary ring gear 52 to thereby rotate the idler gear 46 with its star wheels 44 in one direction or the other. Adjusting rotation of the idler gear 46 is transmitted through the gear 47, sleeve 48 and lock gear 49. Rotation of the lock gear 49 in either direction by manipulation of the manual control 56 is transmitted to the eccentric ring 35 through the attached internal gear 51 meshing with the lock gear 49. Manual operation of the hand-wheel 56 may be effected at any time without impairing or interfering with the planetary drive mechanism; thus it should be quite apparent that the structure disclosed is capable of being adjusted during operation. This arrangement permits very accurate adjustment inasmuch as pressure gauges (not shown) provided on the discharge lines 18 may be observed during the adjustment. The adjustment is such that the mechanism will remain in any position of adjustment until manually readjusted.

In order to accomplish adjustment of the eccentric ring 35 from the "maximum throw" position illustrated in Fig. 2 into the "no throw" position shown in Fig. 3, or into any intermediate position; the axis of the eccentric ring, indicated at "C," is positioned twice as far away from the axis "A" of the shaft 22 as is the axis "B" of the shaft eccentric 34 when the parts are in "maximum throw" position. Consequently, when the eccentric ring is moved into "no throw" position, its axis coincides with the axis of the shaft.

An alternative form of control is illustrated in Fig. 4. The structure there shown functions to move the eccentric ring 35 relative to the shaft eccentric 34 in the same manner as in the structure previously described. In the instance disclosure, however, alternative means is provided to effect manual movement, or adjustment, of the eccentric ring relative to the shaft eccentric. To this end, a sleeve 57 is loosely mounted upon the shaft 22, which sleeve has a lock gear 49a on one end to mesh with the internal gear 51 on the eccentric ring. The major portion of the outside surface of the sleeve 57 is splined as at 58 and is adapted to telescope into an internally splined collar 59 also mounted on a shaft 22. The collar 59 has a pin, or key 61, which co-acts with a helical groove 62 in the shaft 22 and said collar normally is held in any selected position of longitudinal adjustment on the shaft 22 by a manually actuable yoke 63. As is well understood in the art, the yoke 63 has a portion thereof projecting to the outside of the planetary gear casing 27 so that access may be had readily thereto. Under normal conditions of operation, both the splined sleeve 57 and the collar 59 will rotate in unison on the shaft 22. In order to effect adjustment of the eccentric ring 35, the collar 59 is moved toward or away from said eccentric ring, which movement imparts independent rotation to the collar 59 through the engagement of the pin or key 61 with the helix 62. Such independent rotation is, of course, imparted to the collar 57 and likewise to the lock gear 49a forming a part thereof. Although the structure just described is very efficient, the extreme accuracy obtained by the use of the structure illustrated in Fig. 1 is not attained; consequently, its use is limited to applications not requiring critical fluid volumes in the lines 18.

It is believed that my invention, its mode of construction and assembly, and many of its advantages should be readily understood from the foregoing without further description, and it should also be manifest that while a preferred embodiment of the invention has been shown and described for illustrative purposes, the structural details are nevertheless capable of wide variation within the purview of my invention as defined in the appended claims.

What I claim and desire to secure by Letters Patent of the United States is:

1. A drive mechanism including a first shaft having an eccentric mounting an eccentric ring, said mechanism comprising a second rotatable shaft, a sleeve mounted for free rotation on said first shaft adopted to have an operable connection with the eccentric ring, a gear integral with said sleeve, a pinion secured on the first shaft, a first gear secured firmly on the second shaft and meshed with said pinion at all times, a coaxial second gear integral with said first gear, an idler gear mounted loosely on said second shaft and meshed with the sleeve gear, planetary gears carried by said idler gear and meshed at all times with the coaxial gear, a ring gear surrounding and meshed with said planetary gears, said gear train permitting uniform rotation of the first rotatable shaft and the sleeve thereon when power is applied to either shaft, and means to rotate the ring gear to rotate the sleeve independently of shaft rotation.

2. A drive mechanism including a first rotatable shaft having an eccentric mounting an eccentric ring, a sleeve including a coaxial gear journalled for free rotation on said shaft and adapted to be operably connected to the eccentric ring, a pinion on said shaft, a second rotatable shaft, a gear secured firmly on said second shaft and meshed with said pinion, a gear of reduced diameter integrally secured to the gear on the second shaft, an idler gear on said second shaft meshed with the coaxial gear, planetary gears carried by the idler gear and meshed at all times with the gear of reduced diameter, a ring gear surrounding and meshed with the planetary gears, said gear train permitting uniform rotation of the first rotatable shaft and the sleeve thereon when power is applied to either shaft, and means to rotate the ring gear selectively to rotate the sleeve independently of its shaft.

References Cited in the file of this patent

UNITED STATES PATENTS

| | | |
|---|---|---|
| 540,394 | Leitch | June 4, 1895 |
| 794,257 | Sinclair | July 11, 1905 |
| 1,270,028 | Henderson | June 18, 1918 |
| 1,395,735 | Sawyer | Nov. 1, 1921 |
| 1,564,435 | May | Dec. 8, 1925 |
| 1,875,838 | Winckler | Sept. 6, 1932 |
| 1,991,340 | Von Wangenheim | Feb. 12, 1935 |
| 2,005,227 | Johnson | June 18, 1935 |
| 2,008,296 | Soldan | July 16, 1935 |
| 2,051,783 | Dake | Aug. 18, 1936 |
| 2,166,873 | Moore et al. | July 18, 1939 |
| 2,234,674 | Jacobson | Mar. 11, 1941 |
| 2,308,974 | Harper | Jan. 19, 1943 |
| 2,348,958 | Celio | May 16, 1944 |
| 2,796,248 | Sloane | June 18, 1957 |

FOREIGN PATENTS

| | | |
|---|---|---|
| 97,292 | Switzerland | Jan. 2, 1923 |